Patented June 25, 1940

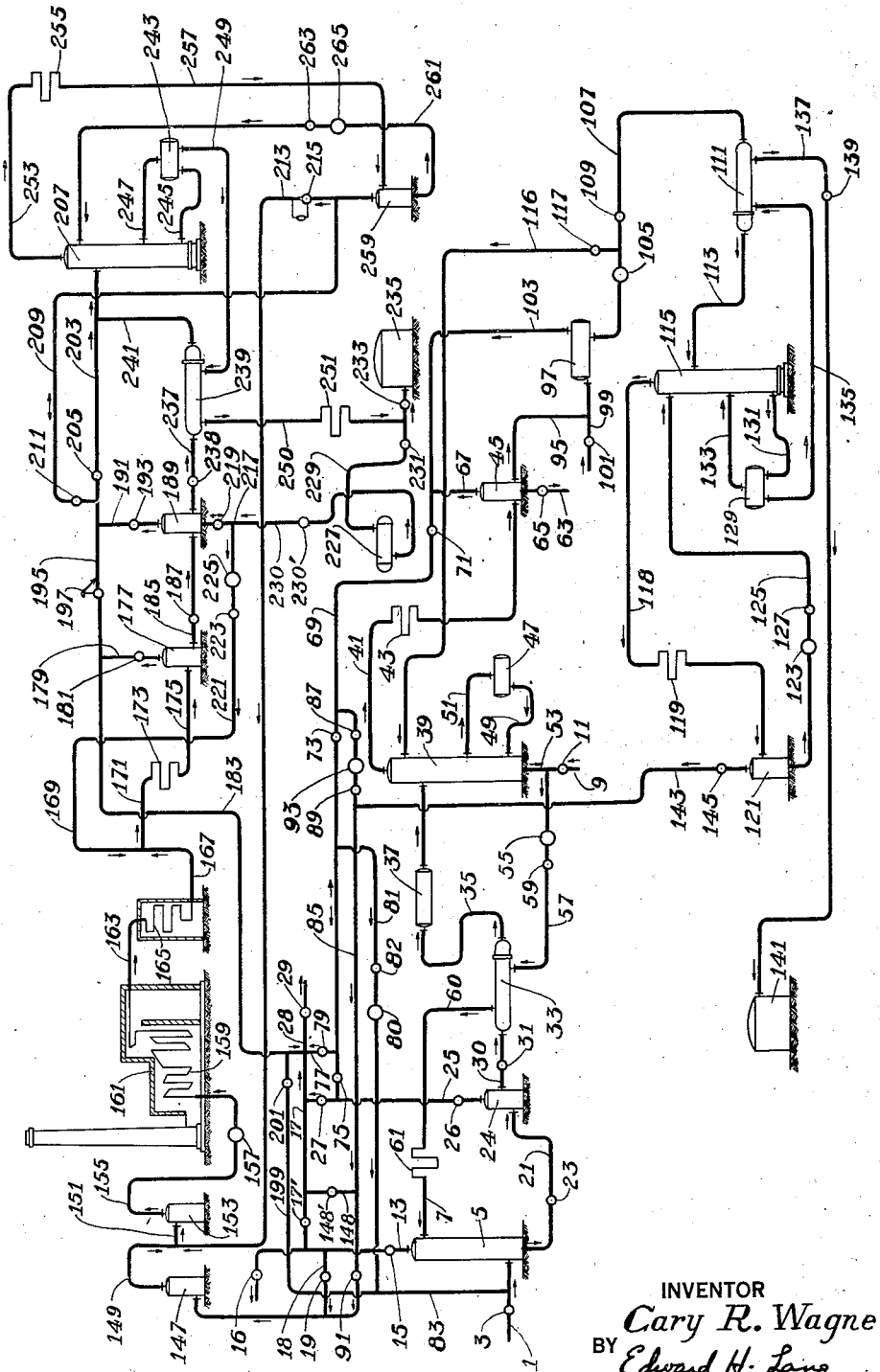

2,205,583

UNITED STATES PATENT OFFICE 2,205,583

METHOD FOR CONVERTING HYDROCARBON GASES INTO LIQUIDS

Cary R. Wagner, Chicago, Ill., assignor to The Pure Oil Company, Chicago, Ill., a corporation of Ohio Application November 22, 1935, Serial No. 51,041

10 Claims. (Cl. 196—10)

This invention relates to method for converting hydrocarbon gases into liquid hydrocarbons, and is more particularly concerned with method for polymerizing olefin-containing gases to liquids boiling within the motor fuel range.

One of the objects of the invention is to provide method for fractionating olefin-containing gases into rich and lean olefin fractions and to charge the fractions in any desired proportions to the conversion zone.

Another object of the invention is to provide method for separating the reaction products into a plurality of successively richer olefin fractions and for recycling certain selected fractions for polymerization.

Another object of the invention is to provide a continuous process for conversion of hydrocarbon gases into liquid hydrocarbons wherein a rich olefinic gas is segregated and charged to the conversion system and to provide for uniform rate of charge by charging sufficient lean gas to compensate for any deficiency of rich gas that may occur from time to time.

Still another object of the invention is the provision of method for automatically proportioning the recycled fraction in such manner that the richest gas is selectively recycled and only sufficient leaner gas is recycled to compensate for deficiencies in quantity of richer gas.

Other objects of my invention will be apparent from the following detailed description considered in connection with the drawing, of which The single figure is a diagrammatic vertical side view of apparatus illustrating my invention.

Referring to the drawing, numeral 1 indicates a line controlled by valve 3 through which gases, containing olefinic or other unsaturated hydrocarbon gases, are introduced into the lower portion of an absorber 5. The gases introduced through the line 1 may be obtained from any suitable source, as for example, gases from a vapor phase cracking plant; or from the stabilizer used for the purpose of stabilizing cracked distillates; or saturated or low olefinic hydrocarbon gases which have been cracked. The gases entering the lower portion of the absorption tower 5 pass in counter-current contact with a liquid absorption menstruum, such as mineral seal oil or other heavy mineral oil distillate, which dissolves olefinic gases in preference to hydrogen, methane and saturated gases. The oil enters the top of the tower through the line 7. Absorption menstruum is introduced into the system when necessary throuh the line 9 controlled by valve 11. The absorber is maintained at a pressure of from 150 to 175 pounds per square inch and preferably between 160 to 170 pounds per square inch.

Unabsorbed gases leave the top of the absorber through the line 13 controlled by valves 15 and 16 and pass out of the system through the top of this line or through line 17 controlled by valve 17'; or a portion may be recycled to the polymerization plant, to be subsequently described, through the line 18 controlled by valve 19. The rich absorption menstruum leaves the bottom of the absorber through the line 21 controlled by valve 23 and passes into a fixed gas eliminator 24 which may be maintained at a pressure of approximately 135 to 140 pounds per square inch and at a temperature of approximately 100° F. A portion of the gases absorbed by the menstruum leave the fixed gas eliminator through the line 25 controlled by valves 26 and 27, and these gases may pass to gas storage through the line 28 controlled by valve 29. The absorption menstruum, with its remaining charge of absorbed gases, passes from the fixed gas eliminator through the line 30 controlled by valve 31, heat exchanger 33, line 35, and hot oil heater 37 where the rich menstruum is heated to approximately 350° F., and then to the upper portion of the still 39.

In the still 39 the menstruum is deprived of its charge of gases and light gasoline fractions and these pass overhead through the line 41 and cooler 43 into the gas and water separator 45 which is maintained under substantially the same pressure as the still. The still is maintained at a pressure of about 60 to 80 pounds and preferably about 70 pounds per square inch. The bottom of the still is maintained at a temperature of approximately 340° F. and the top of the still is preferably maintained at about 205° F. A reboiler 47 is provided for heating the menstruum collected in the mid-portion of the still by circulating the menstruum through the line 51 from the still to the reboiler and thence through the line 49 back to the still. The still is preferably equipped with bubble plates to obtain good fractionation between the absorption menstruum and the light gases and vapors.

The denuded absorption menstruum is withdrawn from the still through the line 53 and recycled by means of pump 55 through line 57 controlled by valve 59, the heat exchanger 33, line 60, and cooler 61, back to the top of the absorber 5. In the exchanger 33 the hot menstruum passes in indirect heat exchange with the relatively cool rich menstruum in order to partially heat the latter and cool the former. Makeup stock is added to the recycled menstruum, when necessary, through the line 9.

Any water that separates out of the condensate in the gas and water separator 45 is withdrawn from the bottom thereof through line 63 controlled by valve 65. Uncondensed gases and vapors leave the top of the gas and water separator through the line 67 from which they pass into the line 69 controlled by valves 71, 73 and 75. From the line 69 the gases may pass to storage through the line 77 controlled by valve 79 and through the line 28; or the gases from line 69 may be charged to the absorber by means of the compressor 80 through line 81 controlled by valve 82, line 83, in which case valves 75 and 79 will be closed; or gases from line 69 may be charged through line 85 controlled by valves 87, 89 and 91, by means of compressor 93, to the polymerization system to be later described. If the gases are recycled to the polymerization system, it will be necessary to close valve 73. It will be evident that by proper regulation of the valves, any portion of the gas may be removed from the system, recycled to the absorber, or sent to the polymerization plant. The portion of the plant to which these gases are sent will depend largely on the capacity of the plant, the volume of gases that are available, and the unsaturated content of the gases.

The condensate from the gas and water separator 45 passes through line 95 to a mixing tank 97 maintained under a pressure of approximately 60 pounds per square inch, where the condensate may be mixed with other condensate introduced through the line 99 controlled by valve 101. Any gases liberated in the mixing tank 97 pass overhead through line 103 and join the gases from the gas and water separator 45 in the line 69. The condensate from the mixing tank is charged by means of pump 105 through line 107 controlled by valve 109, heat exchanger 111, and line 113 to the upper part of a fractionating or stabilizing tower 115. A portion of the condensate from the mixing tank 97 may be recycled through the line 116 controlled by valve 117 to the upper part of the still 39, as reflux. The tower 115 is preferably equipped with bubble plates in order to obtain efficient fractionation. The tower 115 may be maintained at a pressure of approximately 170 to 210 pounds per square inch. The bottom of the tower may be preferably maintained at a temperature of 270° F. while the top may be maintained at approximately 165° F. The gases and light vapors pass overhead from the tower 115 through the line 118 and cooler 119 into reflux accumulator 121. Any condensate collected in the reflux accumulator 121 is charged back to the top of the fractionator as reflux by means of the pump 123 through line 125 controlled by valve 127. A hot oil reboiler 129 is provided for maintaining the condensate in the bottom of the fractionating tower 115 at proper temperature by circulating the condensate through the line 131 to the reboiler 129 and passing vapors therefrom back to the fractionator through line 133. The unvaporized condensate or absorption gasoline may be continuously withdrawn from the fractionating tower through the line 135, heat exchanger 111 and line 137 controlled by valve 139 to storage tank 141. The gasoline which passes to the tank 141 has been weathered and stabilized by having its light ends removed therefrom in the fractionating or stabilizing tower 115.

The uncondensed gases from the reflux accumulator 121 are drawn off from the top thereof through the line 143 controlled by valve 145 and introduced into the line 85 where they may or may not be mixed with gases from line 69, and are then passed into a tank 147 containing caustic soda solution for the purpose of removing hydrogen sulfide from the gases. When the gases from gas and water separator 45 and mixing tank 97 are recycled through line 85, gases from fixed gas eliminator 24 may be recycled along with them by closing valves 27 and 79 and opening valve 75. A portion of the gases in line 85 may be removed from the system if desired by passing through by-pass line 148 controlled by valve 148' and then through line 17, either through line 13 or 28. The gases are withdrawn from the caustic scrubber 147 through the line 149 and pass into the line 151 where they may be mixed with gases, later to be described, and the gas mixture passes into the mixing tank 153. The gases are withdrawn from the top of the mixing tank 153 through line 155 by means of compressor 157 and are charged to a heating coil 159 at a pressure of from approximately 500 to 3000 pounds per square inch, but preferably between 600 to 800 pounds per square inch, wherein the gases may be heated to a temperature of from approximately 700° to 1050° F. The heating coil 159 is located in a suitable furnace 161.

After the gases are heated to the desired temperature in the heating coil 159, they are passed through line 163 to reaction coils 165 which are preferably of larger diameter than the heating coils. If desired, a reaction chamber may be substituted for the reaction coils. Suitable means may be provided for cooling all or a portion of the coils or for insulating any portion of the coils in order to regulate the temperature of the gases therein. In the coils the temperature is preferably maintained within the limits of 700° to 1050° F. for a period of time sufficient to bring about polymerization of a substantial portion of the olefinic and other unsaturated gases to liquid hydrocarbons boiling within the gasoline range. Exposure of the gases to reaction temperatures for excessive periods of time should be avoided in order to prevent formation of large amounts of coke and heavy undesirable liquids or tarry matter. The gases leave the reaction coil through the line 167 and are immediately chilled to a temperature below reaction temperature by means of direct contact with cooling oil introduced through the line 169. The reaction products are preferably cooled to a temperature of approximately 400° to 600° F. The mixture of cooling oil and reaction products then passes through the line 171, cooler 173, and line 175 to a high pressure accumulator 177. The accumulator 177 is maintained at approximately reaction pressure. If, for example, the pressure of the products in the reaction coils is between 540 to 690 pounds per square inch, the pressure in the high pressure accumulator may be between 460 to 610 pounds per square inch, the decrease being due to line losses. The products entering the high pressure accumulator are preferably cooled to a temperature of about 80° to 200° F.

The uncondensed gases leave the top of the high pressure accumulator through line 179 controlled by valve 181 and may be eliminated from the system by passing through the lines 183 and 28. The condensate from the high pressure accumulator passes through the line 185 and control valve 187 into low pressure accumulator 189. The pressure in the low pressure accumulator 189 is maintained at approximately 180 to 220 pounds per square inch and the temperature is preferably maintained at about 60° to 180° F. The gases leave the top of the accumulator 189 through the line 191 controlled by valve 193 and may be disposed of in four ways. The gases may be removed from the system together with gases from high pressure accumulator 177 by passing through line 195 and back pressure regulator 197, lines 183 and 28; or instead of passing out through the line 28, the valve 29 in line 28 may be closed and the gases passed through line 183 and line 199 controlled by valve 201 and recycled to the absorber 5 together with gas from accumulator 177; or the gases may pass through the line 203 controlled by valve 205 into the fractionator 207; or the gases may pass into the line 209 controlled by valve 211 into the line 213 controlled by valve 215 and be mixed with the gases charged to the polymerization plant. It will be evident that by proper regulation of the valves, gases from the low pressure accumulator 189 may be split and portions simultaneously passed to the various places described.

A portion of the condensate from the low pressure accumulator 189 may be withdrawn through the line 217 controlled by valve 219 and charged by means of pump 225 through line 221, controlled by valve 223, and line 169 into contact with the hot reaction products leaving the reaction coils 167 in order to arrest the reaction. The remaining condensate from the accumulator 189 may pass through the line 237 controlled by valve 238, heat exchanger 239 and line 241 to the top of the fractionating tower 207 where remaining condensed gases are separated and the condensate stabilized. The fractionating tower 207 is preferably maintained at a pressure of approximately 170 to 210 pounds per square inch and the bottom of the tower is maintained at a temperature of from 300° to 340° F. while the top is preferably maintained at a temperature of from 100° to 150° F. If desired, a higher pressure may be maintained in the fractionating tower 207 by inserting a pump in line 237. A reboiler 243 is connected to the bottom of the fractionating tower by means of lines 245 and 247 in order to maintain the condensate at proper temperature. The unvaporized condensate may be continuously withdrawn from the reboiler 243 through line 249 and then passed into heat interchange with the relatively cool condensate coming from the low pressure accumulator 189 in the heat exchanger 239. From the exchanger the condensate passes through line 250 and cooler 251 where it is cooled down to substantially atmospheric temperature and then passed into the storage tank 235.

Instead of utilizing unstabilized condensate from low pressure accumulator 189 as arresting fluid, a portion of the stabilized and cooled condensate from cooler 251 may be charged through line 229 controlled by valve 231, surge tank 227, line 230 controlled by valve 230' to line 221. If stabilized condensate is used, the valve 219 in line 217 should be closed.

The gases which are separated in the fractionating tower 207 pass overhead through the line 253 through cooler 255 and line 257 into reflux accumulator 259. The reflux accumulator is preferably maintained at approximately the same pressure as the fractionating tower 207 and at a temperature of approximately 60° to 100° F. Any condensate formed in the accumulator 259 is recycled through line 261 controlled by valve 263 by means of pump 265 to the top of fractionating tower 207 as reflux liquid. The gases from the top of the accumulator 259 are withdrawn through the line 213 and may be entirely recycled for mixture with the gases in line 149 for charging to the polymerization system; or a portion thereof may flow through line 209 and join the gases from the low pressure accumulator 189.

The valve 215 is a metering valve which permits a fixed volume of gases to pass through the line 213. When it is desired to recycle a fixed amount of gas, the metering valve 215 is set at the desired amount and any gas from the top of the reflux accumulator 259 in excess of the amount for which the valve 215 is set, passes through the line 209 into the line 195 either back to the absorber through lines 199 and 83 or to gas storage through line 28. If there is a deficiency in the volume of gases from the accumulator 259, the deficiency is made up by gas from the low pressure accumulator 189 passing through the line 209 and entering the line 213. The back pressure regulator 197 on the line 195 regulates the pressure in line 195 so that the part of the gases from the low pressure accumulator 189 not required to be recycled through lines 209 and 213 flow through line 183. Gases from reflux accumulator 259 will flow through line 209 only when the amount is in excess of that for which the valve 215 is set. If it is desired to recycle only gases from reflux accumulator 259 to the heating and reaction zones, the valves 211 and 205 are closed thereby causing gases from the low pressure accumulator to pass through the line 183 back to the absorber or to gas storage while the total gas from the reflux accumulator 259 is recycled to the polymerization system.

In the preferable method of operation, the gases from the high pressure accumulator 177 are always eliminated from the system through the line 28, and the gases from the low pressure accumulator 189 are used, when necessary, to make up any deficiency in the volume of gases to be recycled to the polymerization unit.

The composition of the gases that are taken off from the high pressure and low pressure accumulators 177 and 189 and from the fractionating tower 207, will depend to a great extent on the composition of the gas charged to the polymerization system and on the conditions of time, temperature, and pressure to which the gases are subjected in the reaction zone. In general, the gases taken off the top of the high pressure accumulator 177 will be relatively lean in unsaturated and olefinic constituents, the gases off the fractionator 207 will be relatively rich in unsaturates and olefins, and the gases off the low pressure accumulator 189 will have an unsaturated or olefinic content intermediate that of the gases from the high pressure accumulator 177 and the fractionator 207.

As an example, fresh gas, having a specific gravity of 1.124 and containing 55% of unsaturated hydrocarbons, was subjected to polymerization under pressure of 650 pounds per square inch for a period of 58.1 seconds and the maximum reaction temperature was approximately 985° F. The gas coming off the high pressure accumulator had a gravity of 1.014 and an unsaturated content of 25.6%. The gas off the low pressure accumulator had a gravity of 1.203 and an unsaturated content of 35.6%. The gas off the fractionator had a gravity of 1.491 and an unsaturated content of 49.98%.

As another example, fresh gas, having a gravity of 1.024 and an unsaturated content of 48%, was charged to the polymerization system where it was subjected to a pressure of 650 pounds per square inch and a maximum reaction temperature of 1007° F. for a period of 73.8 seconds. The gas from the high pressure accumulator had a gravity of 0.856 and an unsaturated content of 24.8%. The gas from the low pressure accumulator had a gravity of 1.052 and an unsaturated content of 33.4%. The gas off the stabilizer or fractionator had a gravity of 1.274 and an unsaturated content of 42%.

As a third example, fresh gas, having a gravity of 1.11 and an unsaturated content of 54%, was polymerized under 650 pounds pressure and a maximum reaction temperature of 1009° F. The gas off the high pressure accumulator had a gravity of 0.95 and an unsaturated content of 14.4%. The gas off the low pressure accumulator had a gravity of 1.22 and an unsaturated content of 34.7%. The gas in line 213, which was a mixture of the fractionator gas and low pressure accumulator gas, had a gravity of 1.32 and an unsaturated content of 40.2%.

It will be seen that in accordance with my process, means are provided for recycling all of the rich olefin gases from the poly plant fractionator to the heating and reaction zone, and means are also provided for recycling a portion or all of the gases of intermediate unsaturated content to the heating and reaction zone. The gases of low unsaturation which are withdrawn from the high pressure accumulator are preferably withdrawn from the system although means are provided for introducing this gas together with gas from the low pressure accumulator, into the absorber 5. The high pressure accumulator 177, low pressure accumulator 189, and stabilizer 207 are maintained at pressures gradually decreasing in the order stated. The olefinic content of the gases liberated at each stage gradually increases from the stage of highest pressure to the stage of lowest pressure.

The volume of gases liberated in the fixed gas eliminator 24 is usually small but of relatively high olefin content, usually ranging from 50 to 55% when the gas having an olefin content of between 40 and 50% is charged to the absorber. The gas liberated in the gas and water separator 45 will be of comparatively large volume and may have an unsaturated content of from 60 to 65%. The gas liberated from the reflux accumulator 121 will be relatively large in volume and will have an olefin content of approximately 65 to 75%.

It will be seen that by proper regulation of the valves, any proportion of the gas from the low pressure accumulator 189 may be mixed with the gases from the fractionator 207 and recycled to the polymerization system. Likewise, gases from the absorber 5, fixed gas eliminator 24, gas and water separator 45, and reflux accumulator 121, may be mixed in any desirable proportion and charged to the polymerization system. In some cases it is expedient to dilute the highly olefinic gases from the reflux accumulator 121 with leaner gases before charging to the polymerization system in order to control the reaction. Gases of high olefinic content react violently and have a tendency to form coke and tarry material. By proportioning the high olefinic gases with leaner gases, a desired olefinic content can be obtained which is most suitable under the conditions of temperature and pressure used.

Although I have described my invention in connection with the use of pressures above 500 pounds per square inch, the invention is not limited to operation at these conditions but may be operated at lower pressures and correspondingly higher temperatures.

What I claim is:

1. In a process for the polymerization of olefinic gases at elevated temperature and under super-atmospheric pressure, the steps of separating unreacted gases from liquid products in three stages wherein the first stage is at substantially reaction pressure and relatively low temperature and the subsequent stages are at progressively lower pressures, recycling a fixed amount of gas for admixture with fresh gases charged to the process, and automatically regulating the recirculation from the separating stages so that all the rich olefinic gas up to said fixed amount is recycled from the last stage and any deficiency in said fixed amount is made up from leaner olefinic gases from the second stage.

2. In a process for the conversion of olefin-containing hydrocarbon gases into liquid hydrocarbons in a conversion zone at temperatures and pressures suitable for bringing about such conversion, the steps of separating the fresh gas to be converted into at least two fractions, one of which is leaner in olefins than is desired in the charging gas and another of which is richer in olefins than is desired in the charging gas, and proportioning the amount of each fraction charged to the conversion zone in order to obtain a predetermined desired olefin content in the gas charge.

3. In a process for the conversion of fresh olefin-containing gases into liquid hydrocarbons by subjecting gases to suitable conditions of temperature and pressure in a reaction zone, the steps of separating the fresh gas to be converted into at least two fractions, one of which is lean in olefins and another of which is rich in olefins, charging substantially all the rich olefinic gas to the reaction zone, and adding to the rich olefinic gas a sufficient quantity of lean olefinic gas to maintain the charging rate constant.

4. In a process for the conversion of fresh olefin-containing gases into liquid hydrocarbons by subjecting gases to suitable temperature and pressure conditions in a reaction zone, the steps of contacting the gases with a hydrocarbon solvent which dissolves olefinic gases in preference to hydrogen and methane, under super-atmospheric pressure, separating the undissolved gases from the solvent, separating the dissolved gases from the solvent in a separate zone, charging substantially all the latter gases to the conversion zone, and adding sufficient of the undissolved gases to the charge to maintain the charging rate constant.

5. A process for conversion of olefin-containing gases into liquid hydrocarbons which comprises separating said gases into at least two fractions, one of which is relatively lean in olefins and the other of which is relatively rich, charging gas at a uniform rate to a heating and reaction zone wherein conditions of temperature and pressure suitable for conversion of gases to liquids are maintained, charging substantially all of the richer olefinic fraction to the conversion zone and charging only a sufficient amount of the lean olefinic fraction to maintain the charging rate uniform, separating the gases issuing from the reaction zone into at least two fractions, one of which is lean in olefins and another of which is rich in olefins, recycling substantially all the rich gases to the polymerization zone and recycling only sufficient of the lean gas to maintain the recirculation rate constant.

6. In a process for converting olefin-containing hydrocarbon gases to liquid hydrocarbons under high superatmospheric pressure the steps which comprise separating gaseous from liquid reaction products in at least three stages, separating in the first stage gases too low in olefins to be returned to the process, separating in the last stage gases rich in olefins and recycling the same to the process, separating in an intermediate stage gases having an olefin content between that of the first and last stage gases and recycling a portion of said gas from the intermediate stage for further conversion.

7. The steps in accordance with claim 6 in which the gas from the intermediate stage is fractionated to increase its olefin content prior to recycling it to the process.

8. The steps in accordance with claim 6 in which gases from the first and intermediate stages are fractionated into a fraction of lower olefin content and a fraction of higher olefin content, the lower olefin content fraction is eliminated from the process and the higher olefin fraction is recycled for further conversion.

9. The steps in accordance with claim 6 in which a portion of the gas from the intermediate stage is eliminated from the process.

10. In a process for the conversion of olefin-containing hydrocarbon gases into liquid hydrocarbons in a conversion zone at temperatures and pressures suitable for bringing about such conversion, the steps of separating the fresh gas to be converted into a gas richer in olefins than is desired in the charging gas and a fraction leaner in olefins than is desired in the charging gas, charging all the richer olefin-containing gas to the conversion zone and mixing with the richer gas prior to conversion thereof sufficient of the leaner gas to reduce the olefin content of the mixture to a concentration intermediate of the original gas and the richer gas.

CARY R. WAGNER.